United States Patent Office 3,470,104
Patented Sept. 30, 1969

3,470,104
SORBENT MATERIAL AND FILTER AID COMPOSITIONS AND THE PROCESS FOR THE PREPARATION THEREOF
Lawrence Domas, 960 E. Greendale,
Detroit, Mich. 48203
No Drawing. Filed Apr. 30, 1964, Ser. No. 364,020
Int. Cl. C09k 3/00
U.S. Cl. 252—188                    7 Claims

ABSTRACT OF THE DISCLOSURE

Filter aid compositions useful for the removal of soil complex impurities from non-polar organic dry cleaning solvents are described. Particularly described are filter aid compositions incorporating a reducing agent which reacts with the soil complex impurities in the presence of small amounts of water to insolubilize the soil complex impurities. The reducing agents are also described in combination with various sorbent materials, particularly metal and salts which are coated on the surface of a filter, aid material. Also described are the use of aerating agents in the filter aid composition with the reducing agent which generates a gas in situ to improve the filtration rate through the filter cake. Further clay sorbent materials in combination with hydrophobic metal dispersing agents to prevent adhesion of the clay sorbent material are described.

---

This invention relates to novel sorbent material and filter aid compositions and the processes for the preparation thereof. More particularly, this invention relates to improved sorbent material and filter aid compositions useful in removing soils or impurities, particularly color impurities or soils, from used dry cleaning solvents and the processes for the preparation of these compositions.

The term "sorption" as used herein characterizes the total amount of solid, liquid or gaseous material taken up by a solid sorbent material. It includes adsorption wherein the solid, liquid or gaseous material is retained on the surface of a sorbent material as well as absorption wherein the solid, liquid or gaseous material is taken into the interior of the solid sorbent material. In most instances it is difficult to characterize whether adsorption or absorption or both is operating in a system and thus the term "sorption" is used to include both phenomena.

Filtration has long been known as a means of removing impurities from solutions. In its simplest form, a permeable member is positioned such that the solution passes through it, thereby removing solids from the liquid. The primary problems encountered with this type of filtration are that the solids tend to agglomerate or compact on the surface of the permeable member or filter, thereby preventing the solution from passing through the filter, and that impurities which are soluble in the solution are not removed.

In order to overcome the problem of the agglomeration of solids on the surface of the filter, various materials known as filter aid materials have been used in filtration by the prior art. A filter aid material, which is a finely divided solid, is generally precoated on the surface of the permeable member, usually by mixing with the solution to be filtered which is then filtered, thus precoating the permeable member. The filter aid material builds up a porous, permeable, incompressible cake or lattice structure on the surface of the permeable member. Finely divided solids originally suspended in the solution are upon filtration simultaneously entrained in the cake as it is built up and the porous nature of the cake prevents these solids from agglomerating and forming an impervious layer on the surface of the permeable member or filter. Thus, the combination of the permeable member, the filtered out solids and the filter aid material forms the filter medium where the work of filtration takes place.

Diatomaceous earths have been utilized extensively as filter aid materials by the prior art. The high flow rates and brilliant clarity achieved through the use of these filter aid materials is believed to be due to the unique variegated structure of the silica diatoms which interlace themselves in the filter cake or filtered solids to form numerous traps for even sub-microscopic particles while still providing interstices between the particles to insure good cake permeability to allow passage of the solution being filtered.

Diatomaceous earth filter aid materials are supplied in regular, milled, calcinated and flux calcinated grades, the various grades differing in filtration rates and clarification capacity in various filtration process. Commercially available filter aid grades of diatomaceous earths are essentially pure amorphous silica in the form of a plurality of geometrical shapes such as filiform, spicular, denticular, and plankton discs. Illustrative of various prior art diatomaceous earth materials are those disclosed in the following United States Patents: 665,652; 1,503,133; 1,713,250; 1,992,547; 2,468,188; 2,542,743; 2,698,251; 2,701,240; 2,831,578 and 3,013,981.

Other materials besides the diatomaceous earth materials are known to the prior art as filter aid materials. In certain instances, specially treated clays and the like can be used in the place of the diatomaceous earths as filter aid materials. Reissue Patent 25,464 discloses a specially treated attapulgite clay and the process for preparing the same. These and other finely divided solid materials are used as substitutes for the diatomaceous earth filter aid materials.

The prior art filter mediums comprising the permeable members and the filter aid materials are useful for removing solids, particularly very small particle size solids such as suspended solids, from various solutions. The principal problem with these filter mediums is that they are relatively ineffective in removing color impurities from the solution being filtered. In general, unless these filter mediums incorporate a sorbent agent or material, the color impurities remain in the solutions after filtration. Thus, the prior art has incorporated various sorbent agents with the filter aid materials in order to remove color impurities. Some sorbent materials are disclosed in the above cited patents.

In general, a relatively small amount of the sorbent agents are combined with the filter aid materials because even in the relatively small amounts, the sorbent agents tend to agglomerate in the filter medium forming a relatively impervious barrier to solvent flow, and reduce the filtration rate below acceptable levels. In general, only about five percent (5%) of the impurities or soils may be removed by the prior art filter mediums incorporating a sorbent agent before there is a severe hindrance to the flow rate. Known prior art sorbent agents are activated carbon and various magnesium and/or aluminum containing silicate clays and the like.

Another problem encountered with the prior art sorbent materials is that they tend to agglomerate or bind together upon standing before use, because of the hygroscopic nature of these materials which allows them to take free moisture from the air. Thus, these materials whether alone or in combination with the filter aid materials, such as the diatomaceous earths, lose their sorbent ability upon standing. Once this occurs, their utility as sorbent materials alone or in combination with filter aid materials is greatly reduced.

Another problem encountered by the prior art is particularly concerned with the removal of chemical activators by the sorbent agents from the used dry cleaning solvents. In general, in order to make dry cleaning solvents more effective in removing soils from materials being dry cleaned, various chemical activators, usually long chain organic acids, are added to the solvents. These chemical activators are usually referred to by dry cleaners as "dry cleaner's soap" or "soap charge." These chemical activators greatly aid in the removal of soils from materials being dry cleaned. Upon regeneration of the solvent, the problem encountered with the prior art filter mediums incorporating various sorbent agents is that they remove considerable amounts of the chemical activators, thereby requiring their re-addition into the solvents after the filtration process before these solvents can be used for dry cleaning. It would be highly advantageous if the filter medium did not remove these chemical activators.

It is therefore an object of the present invention to provide improved sorbent material and filter aid compositions which are useful in removing impurities from non polar organic solvents and also allow very high rates through the filter medium.

It is further an object of the present invention to provide improved sorbent material and filter aid compositions which do not remove substantial amounts of the chemical activators from the dry cleaning solvents.

Further still, it is an object of the present invention to provide processes for the preparaion of and methods for the use of these sorbent material and filter aid compositions which are simple and economical.

These and other objects will become increasingly apparent to those skilled in the art as the description proceeds.

The present invention relates to filter aid compositions incorporating an acidic material with a pH between about 2.5 to 6, the filter aid composition having a pH between about 4 to 8. The present invention further relates to the improved sorbent material compositions which comprise the reaction product of a hydroxyl group containing sorbent material and an acidic material having a pH bewteen about 2.5 to 6, the resulting composition having a pH between about 4 to 8 measured in about 1 to 5 percent by weight water. The preferred acidic materials are zinc chloride, phosphoric acid and potassium hemiphosphate.

This invention also relates to improved filter aid compositions for removing impurities from non polar organic solvents which comprise a filter aid material, preferably with a particle size between about 20–80 microns, such as a diatomaceous earth, in combination with one or more of various other materials including:

(1) A sorbent material prepared by reacting a hydroxyl group containing sorbent material with an acidic material having a pH between about 2.5 to 6 with a particle size between about 0.05 and 100 microns in admixture with the filter aid materials, the filter aid composition having a pH measured with about 1 to 5 percent by weight water between about 4 to 8, and the composition containing about 0.0005 to 2.0 parts by weight sorbent material per 1.0 part by weight filter aid material. Another particularly preferred sorbent material consists of a metal acid salt, the sorbent material being bonded to the surfaces of the filter aid material, the filter aid composition containing about 0.0005 to 2.0 parts by weight sorbent material per 1.0 part by weight filter aid material and the filter aid composition having a pH measured with about 1 to 5 percent by weight water of between about 4 to 8. The preferred metal acid salt sorbent materials of this class are the zinc chloride, ferric chloride and the acid phosphates of zinc and iron.

(2) A reducing agent. The preferred reducing agents are finely divided metals such as aluminum, magnesium or zinc with a particle size between about 0.01 to 100 microns. The composition generally contains about 0.001 to 0.25 part by weight reducing agent per 1.0 part of the filter aid material.

(3) Between about 0.001 to 0.25 part by weight of an aerating agent in combination with 1.0 part by weight filter aid material. The reducing agents above discussed generate hydrogen in situ, which acts as an aerating agent, however other aerating agents which generate a gas in situ such as nitrogen, carbon dioxide or oxygen, for instance, during the filtration operation can be used very effectively alone or in combination with the reducing agents.

(4) A substantially dry clay sorbent material with a particle size between about 0.05 to 100 microns in admixture with the filter aid material and a metal dispersing agent, which prevents the adhesion of the particles of the sorbent material, with a particle size between about 0.5 to 50 microns in admixture with the filter aid material and the sorbent material, the composiion remaining essentially free flowing for extended periods of time and the composition containing about 0.0005 to 2.0 parts by weight sorbent material and about 0.001 to 0.25 part by weight dispersing agent per 1.0 part by weight filter aid material. The preferred dispersing agent is aluminum (atomized aluminum powder), and the preferred sorbent materials are the various magnesium and/or aluminum silicate materials, generally classified as clays. The composition containing the sorbent material and dispersing agent has utility independently of the filter aid material in that it is a free flowing sorbent material composition. This composition generally contains about 0.001 to 20.0 parts by weight dispersing agent per 1.0 part by weight sorbent material.

The various materials above discussed, can be used alone or in combination with each other in preparing a filter aid composition. Generally, the combination products have greatly improved properties and are thus particularly preferred.

The present invention also includes various processes for the preparation of the improved sorbent material and filter aid compositions of the present invention.

The process for the preparation of an improved sorbent material composition comprises heating a clay sorbent material with a particle size between about 0.05 and 100 microns until it is substantially dry; anhydrously cooling the sorbent material; and mixing a metal dispersing agent with a particle size between about 0.5 and 50 microns with the cooled, anhydrous sorbent material, thereby producing the sorbent material product, the product containing about 0.001 to 20.0 parts by weight dispersing agent per 1.0 part by weight clay sorbent material.

The process for the preparation of a preferred improved filter aid composition comprises mixing a finely divided filter aid material, preferably with a particle size between about 20–80 microns, with aobut 1 to 5 percent by weight water and a sorbent material, consisting of a metal acid salt, the resulting mixture containing about 0.005 to 2.0 part by weight sorbent material per 1.0 part by weight filter aid material; adjusting the pH of the resulting mixture to between about 4 to 8; and heating the mixture with the pH adjusted to a temperature between about 250° F. to 300° F., thereby bonding the sorbent material to the surface of the filter aid composition product.

The present invention also includes a method for regenerating a used dry cleaning solvent by use of filter aid compositions, the step which comprises adding an acidic material having a pH between about 2.5 to 6 to a dry cleaning solvent, sufficient acidic material being added to substantially eliminate impurity produced solvent coloration. The present invention, particularly includes in a method for regenerating a used dry cleaning solvent by use of filter aid compositions, the step which comprises adding a metal acid salt to a dry cleaning solvent, sufficient metal acid salt being added to substantially eliminate impurity produced solvent coloration. Further the present invention includes in a method for regenerating a used dry cleaning solvent by use of filter aid compositions, the step which comprises adding a reducing agent, sufficient reducing agent being added to substantially eliminate impurity produced solvent coloration.

Having generally described the improved sorbent material and filter aid compositions of the present invention, the processes for the preparation thereof and the methods of solvent regeneration, the various aspects of the present invention will be discussed more specifically.

Acid materials

The sorbent materials presently being used by the prior art in filter aid compositions contain hydroxyl groups. The various commercial clay materials, which are magnesium and/or aluminum silicate materials, contain numerous hydroxyl groups. Also various metal hydroxides which form a relatively insoluble flocculate in various solvents have been used as sorbent materials. Magnesium and/or aluminum silicate materials are for instance the attapulgite, sepiolite, and montmorillonite clays. Metal hydroxides are for instance ferric hydroxide and zinc hydroxide.

It has been found that when hydroxyl bearing sorbent materials are reacted with an acidic material having a pH between about 2.5 to 6 that the resulting sorbent materials are highly effective when used in filter aid compositions having a pH between about 4 to 8 measured in 1 to 5 percent by weight water.

The present invention also includes the preparation and use of certain novel filter aid compositions having a pH between about 4 to 8 incorporating synthetic sorbent materials. These sorbent materials are metal acid salts. Preferred synthetic sorbent materials of this class are zinc chloride, zinc fluoride and zinc acid phosphate which are acidic materials having a pH between about 2.5 to 6. It was found that metal acid salts of metals such as aluminum, zinc, iron, magnesium, nickel, tin, lead (especially lead magnesium alloys) and the like were particularly effective. Also preferred are metal acid halide (chloride, fluoride, iodide and bromide) salts as well as metal acid phosphate (mono- or di-) salts. Any water soluble or any water dispersible acid salts of organic acids such as formic acid, acetic acid, propionic acid, n-butyric acid, isobutyric acid, n-valeric acid, isovaleric acid, methylethylacetic acid and trimethylacetic acid were also used effectively. Essentially any metal acid salt with a pH between about 2.5 to 6 can be utilized effectively.

In order to understand why the pH of the filter aid composition must be between about 4 to 8, a brief discussion is presented on the mechanism believed to be operating. The following discussion will be oriented towards the regeneration of dry cleaning solvents, but it will be appreciated that the discussion is generally applicable to non polar solvents.

Solvent coloration produced by impurities in used dry cleaning solvents is believed to be due in large part to soil complexes resulting from the reaction of an acidic proton donor soil with a basic electron donor soil. The prior art has considered solvent coloration to be caused by an accumulation of fats, soaps and fatty acids in the solvent and by fugitive dyes removed from materials being dry cleaned. It has been found however that the characteristic solvent coloration development (yellow to amber to red) is primarily attributable to the formation of the soil complexes.

The basic and acid soils accumulate because they are removed from the materials being dry cleaned. It has been found that the dry cleaning of proteinaceous materials, particularly woolen materials, and garments containing amine sizing materials, encourages the development of red solvent coloration. It is believed that these are the principal sources of basic soils that combine with acid soils to form the soil complexes which produce a very dark red solvent coloration. Wool, silk, cotton and rayon have been found to cause considerable solvent coloration.

The development of the soil complex in the solvent produces increased solvent polarity, because of the polar nature of the soil complex. The increased polarity reduces the ability of the solvent to retain the complex in solution. A soap charge improves the ability of the solvent to retain the soil complex in solution, but only to a limited extent. Once the solvent polarity increases beyond a certain point, the soil complex comes out of solution and produces the strong red solvent coloration and also produces the dry cleaner's complaints of odor, swalling and redeposition.

Color development is also characterized by the loss of the water retention ability of the solvent. "Water retention" is defined as that quantity of water which the solvent is capable of retaining before additional water added to the solvent decreases its conductance. It has been found that a solvent should retain about 0.2 to 0.4 percent by volume of water with not less than 1.0 percent by volume of soap charge and that the charge volume percent to soil weight ratio should not be less than about 1 to 4. Extreme deviation from this 0.2 to 0.4 and 1.0 to 4.0 ratio precipitates the soil complex producing "odor," "swalling" and "redeposition." The loss of water retention ability thus correlates to the characteristic development of the solvent color.

It has been found that by using filter aid compositions with a pH between about 4 to 8 incorporating the various improved sorbent materials, the color impurities or soil complexes are removed from the dry cleaning solvent without removing substantial amounts of the chemical activators. The resulting regenerated solvents are equally effective in dry cleaning as the original solvent materials.

The conventional sorbent materials, such as the commercial clay materials, remove impurities and also chemical activators or charge materials from dry cleaning solvents. The chemical composition of the sorbent materials is such that they do not distinguish between reaction product of the acidic proton donor soil and the basic electron donor soil and the anionic groups of the soap or charge materials, and both are removed by the conventional sorbent materials. This is at least in part because the pH of the filter aid compositions incorporating these sorbent materials is such (above pH 8) that they remove all materials including the charge materials. Heretofore, the prior art has considered it an absolute necessity to maintain the pH of the filter aid compositions above about 8 to remove all materials including the charge materials from the dry cleaning solvents in order to regenerate them.

The hydroxyl bearing sorbent materials used in the present invention when treated with an acidic material with a pH between about 2.5 to 6 are electronegative when the pH of the filter aid composition incorporating them is between about 4 to 8. The soil complexes are electropositive and are attracted to and react with the acidified sorbent material and are removed from the non polar solvent.

When the metal acid salt sorbent materials are used in a filter aid composition with a pH between about 4 to 8 it is believed that the acid portion of the salt displaces the acid soils in the soil complexes forming a new complex with the basic soil which is effectively removed from the solvent by the filter aid composition. The acid soil is believed to form a metal ester which precipitates and is removed by the filter aid composition. In general the acidic materials with a pH between about 2.5 to 6 are believed to react with the basic soil portion of the soil complex in this manner when added to a filter aid composition or to the solvent.

Apparently the reason the chemical activators are not removed by the filter aid compositions incorporating these sorbent materials when the pH is between about 4 to 8, is because chemical activators are electronegative and thus repelled by the sorbent materials. It is only this pH range which produces this result.

Thus for instance it was found that the metal acid salts zinc chloride, zinc fluoride or zinc acid phosphate for example when used in filter aid compositions with a pH in the range of about 4 to 8 measured with about 1 to 5 percent by weight water effectively removed color impurities from used dry cleaning solvents. This result was found in all dry cleaning solvents presently commercially available including chlorinated and Stoddard's solvents.

Thus for instance it was found that in dry cleaning solvents, zinc chloride removed the color impurities from the solvent and that they were retained on the surface of the zinc chloride as a flocculate. It was also found that substantially none of the dry cleaning charge (anionic soaps) were removed.

Zinc chloride in a filter aid composition with a pH above 8 removed the dry cleaning soap charge along with the solvent soil and color impurities. Above a pH of about 8 zinc hydroxide forms. Between a pH of about 3 to 4 solid impurities were removed but the solvent color remained or increased even though the chemical activator was not removed. Below a pH of about 3 zinc chloride is formed. In this instance, neither the color impurities or other soils are removed.

In order to demonstrate the operation of the zinc chloride in filter aid compositions with the pH range between about 4 to 8 and outside of this pH range, the following Example I is presented.

Example I

A used dry cleaning solvent, perchloroethylene, was provided. The solvent had the following characteristics:
Charge—1% Aerosol OT (ester of a sulfonate bicarboxylic acid as shown in U.S. Patent 2,028,041 prepared using sodium hydroxide to give a pH of 10 and in a 5% volume solution with isopropanol).

| | |
|---|---|
| Solvent color | Amber |
| Non volatile residue | 2.4 |
| Acid residue | 2.4 |
| Acid number (milligrams of potassium hydroxide necessary to neutralize 1.28 milliliters of solvent containing one gram of oleic acid) | 0.3 |
| Solvent pH | 8.2 |

Three 100 ml. of this solvent were mixed with one green of zinc chloride (pH about 3) crystals. The zinc chloride was further prepared (by adding aqueous sodium hydroxide) in one of two pH states: pH 6.5 and pH 8.5. The following data was obtained as shown in Table I.

TABLE I

| pH of $ZnCl_2$ | Presence of Flocculate on $ZnCl_2$ | Solvent Color | Changes in 4500 A.* Absorption (percent) | Non-Volatile Residue | Acid No. | Solvent pH |
|---|---|---|---|---|---|---|
| 3.0 | Yes | Red | +20.0 | 2.2 | 0.5 | 7.6 |
| 6.5 | Yes | Yellow | −40.0 | 1.8 | 0.6 | 7.8 |
| 8.5 | No | Amber | 0.0 | 2.4 | 0.3 | 8.2 |

*Colormetric determination using monochromatic light at 4500 A.

Thus, as can be seen from Example I and Table I, the change in the pH has a marked effect on the ability of the sorbent material to remove the solvent color. It was found that the result at pH 6.5 was duplicated when the pH was maintained between about 4 to 8.

If electrovalent zinc is allowed to react with the surface of a sorbent or filter aid material through the hydroxyl groups thereon, a non-exchangeable zinc salt is formed. At a pH between about 4 to 8, zinc hydroxychloride is formed. The exact structure of the compound is unknown but may be $Zn(OH)_2 2HCl$. The most effective complex of the zinc hydroxychloride with an electron donor such as amine is produced at a pH of about 6.5. The pH of 6.5 is apparently ideal to form a nonionizable complex with the electron donor such as the amine. It was observed that this complex when allowed to remain in contact with the solvent for 5 to 7 days did not show any sign of disassociation.

In general, the acidic materials such as the metal acid salts are bonded to the surface of or reacted with the filter aid material or sorbent material in the filter aid compositions in order to achieve the best results and this is preferred. However, it will be appreciated that the acidic materials can be admixed in the filter aid composition and will work effectively. The process for bonding the metal acid salts to the surface of the bulk filter aid material will be discussed more fully hereinafter.

As above discussed, it was found that the magnesium and/or aluminum silicate materials or clays when treated with acidic materials with a pH between about 2.5 to 6 to give the resulting filter aid composition a pH between about 4 to 8 remove the soil complexes without removing the charge or soap. In an operating system of the prior art, for instance, attapulgite clay easily removes 10% to 25% of the solvent coloration and soils without removing the soap charge. The removal of more solvent coloration results in a proportionately greater removal of the soap charge until essentially it is almost all removed. By treating these sorbent materials with acidic materials with a pH between about 2.5 to 6 to give the resulting filter aid composition a pH between about 4 to 8, the solvent coloration is almost completely removed, but the soap charge is maintained at about its original level.

The metal acid salts can be added separately to the solvent prior to filtration. It is believed the metal acid salt reacts with the soil complex to form metal esters and acid complexes as above discussed. In general sufficient metal acid salt is added to substantially eliminate impurity produced solvent coloration.

It was also found that any acidic material having a pH between about 2.5 to 6 could be added to the solvent. It is believed that these acidic materials react with the basic portion of the soil complex, causing it to precipitate. Acids in this pH range which are suitable are for instance: formic, acetic, propionic, n-buteric acid, isobutyric, n-valeric, isovaleric, methylethylacetic, trimethylacetic and phosphoric acid. In general acids with a pH between about 2.5 to 6 are suitable; however, phosphoric acid (pH 2.5) is preferred. In general sufficient acid is added to substantially eliminate impurity produced solvent coloration. In particular it was preferred to use ¼ pound of the preferred phosphoric acid (75 percent by weight phosphoric acid in water solution) for every 4 pounds of soils in the used solvents. The soils are measured as the non volatile residue in the solvent. The phosphoric acid removed impurity produced solvent coloration. The reaction products of the soil complex and acidic materials are removed by the prior art or the improved filter aid compositions in the conventional manner.

Reducing agents

The combination of the filter aid materials with various reducing agents results in filter aid compositions which are also highly effective in removing soluble impurities from non polar organic solvents. The reducing agents cause the soluble impurities to be insolubilized and also, because of their reducing action, tend to generate hydrogen gas in situ which aerates the filter cake.

The reducing agents may be either organic or inorganic. Examples of inorganic reducing agents are metals such as aluminum, zinc, iron, magnesium, nickel, tin, lead (especially lead magnesium alloys) and the like. In general, these metal materials have a particle size between about 0.01 and 100 microns in the filter aid compositions. Especially preferred reducing agents are powdered aluminum or magnesium.

Other inorganic reducing agents are, for instance, sodium hypophosphite, sodium sulfite, and the acids and acid salts of these materials. Still other inorganic reducing agents are the various metal hydrides such as lithium aluminum hydride, aluminum hydride, calcium hydride, zinc hydride, ferrous hydride, ferric hydride and the like.

Organic reducing agents can also be utilized such as, for instance, the aliphatic aldehydes such as acetaldehyde, propionaldehyde and formaldehyde and the like. Further aromatic aldehydes such as benzaldehyde can be effectively utilized. Oxalic acid can also be used as an organic reducing agent.

The reducing agents can be liquid or solid and can be organic or inorganic. Thus, in essence, virtually any reducing agent can be utilized in the filter aid compositions of the present invention. The action of the metal reducing agents is improved by incorporating small amounts of a polar material such as water and/or various alcohols and various bases such as sodium hydroxide or various acids such as hydrochloric acid or phosphoric acid to facilitate the generation of hydrogen gas.

The oxidization of the metal powders best illustrates the utilization of the reducing agents in the filter aid compositions of the present invention. The oxidation is illustrtaed by the following equation:

metal+water→metal hydroxide+hydrogen gas

For instance:

$$2Al + 6H_2O \rightarrow 2Al(OH)_3 + 3H_2$$

The use of the metals, particularly as finely divided powders, produces aeration of the filter bed or filter precoat formed by the filter aid composition. When metals more electropositive than hydrogen are placed in a filter coat in the presence of a polar solvent such as water, and preferably a water ionizable salt, acid or base, hydrogen gas is evolved. This small evolution of gas, even though it opposes solvent flow through the filter, agitates the flow resistant filter bed to allow an increase in solvent flow through the filter bed or medium. It further reduces the number of backwashes necessary to regenerate the filter aid composition and thus prolongs the useful lifetime of the filter aid composition by separating the water adhering particles of an otherwise flow resistant filter aid composition or precoat. Further, the sorbent capacity of the bed is improved because of the resulting increased sorbent surface area. Further, it was found experimentally that the reducing agents by the formation of the gaseous hydrogen very effectively aided filtration and prolonged the life of the filter aid composition as will be illustrated more fully hereinafter. A similar result was obtained with reducing agents other than the metals.

The reducing agents also act to reduce the solvent coloration. This is believed to be due to the formation of insoluble salt or ester materials as a result of the action of the reducing agents on the soluble color impurities or color complex. The ester materials are removed upon filtration. The liberated amine is free to be sorbed by the sorbent materials as above discussed. Thus, the reducing agents perform a number of useful functions.

The preferred filter aid compositions incorporating reducing agents are those which incorporate a metal and a metal acid salt. It is preferred to have a pH of about 6.5, but it can be within the range between about 4 to 8 in pH. Characteristically the more ionizing the metal acid salt is in a polar solvent such as water, the greater effect it will have on the metal. The preferred salts are monopotassium acid phosphate and potassium acid sulfate. However, any metal acid salt would be suitable. The metal powders may be any of those which have a positive oxidization potential above hydrogen in an alkaline solution. (Reference Moeller Inorganic Chemistry 1952, pages 288–289, Table 8.3). The preferred metals are aluminum, magnesium, iron and zinc. The factors which determine the preferred metals are the high oxidization potential, ease of oxidation, but stable on storage at ambient conditions, availability and cost.

It will be appreciated that the reducing agents can be added directly to the solvent prior to filtration. In general sufficient reducing agent is added to substantially remove the impurity produced solvent coloration.

Aerating agents

Various aerating agents were used to reduce filter pressure. Illustrative is the following discussion showing the generation of carbon dioxide in situ.

The following data was collected on this means of generating carbon dioxide in situ to maintain cake porosity. The salts used in admixture with a diatomaceous filter aid were sodium carbonate and monopotassium acid phosphate. Upon reaction these materials form carbon dioxide. The use of either salt alone did not produce a significant difference in the data obtained. The differences in specific gravity of Stoddard's and perchlorethylene solvent produce different flow pressures.

Filament and tubular filters were precoated in the perchloroethylene system and filament in the Stoddard system. In the chlorinated systems tested, the filament and tubular filters produced the same data and are listed below. These tests were conducted with a "Street's Conductivity System" which maintained the water concentration at approximately 0.1%.

During the period of testing, the filter pressure (p.s.i.) was recorded and averaged on 10 trials. Recordings were made after 300 lbs. of cleaning (A) and after 600 lbs. of cleaning (B), each after an initial fresh four pound filter aid composition precoat. The solvent was not allowed to flow through the precoat for a period of 12 hours after the 600 lbs. of cleaning (B) (solvent flow rated at a maximum of 40 gals. per min.). The procedure of alowing the filter coat to remain is not normally practiced in actual operations since the filter aid compositions of the prior art consolidate into an impervious mass which severely inhibits the solvent flow upon reflow. The number of backwashes per week was also recorded (D). The initial flow pressure of the cake after 12 hours of flow stagnation was recorded (C). The results are set forth in Tables II and III.

TABLE II

[Five percent (5%) by weight of salt mixture]

| Perchloroethylene | | | | | Stoddard | | | | |
|---|---|---|---|---|---|---|---|---|---|
| | A | B | C | D | | A | B | C | D |
| Celite-Hyflo™ [2] | | 10 | 15 | 10 | Celite-Hyflo™ [2] | | 4 | 15 | 10 |
| Sil-Flo 443™ [3] | | 8 | 15 | 10 | Sil-Flo 443™ [3] | | 4 | 15 | 10 |
| Attapulgite | | 14 | | 15 | Attapulgite | | 10 | | 13 |
| Activated carbon [1] | | | | 30 | Activated carbon [1] | | 15 | | 25 |

See footnotes at end of Table III.

TABLE III

[Five percent (5%) by weight of salt mixture and 0.1% by weight aluminum dust]

| | Perchloroethylene | | | | | Stoddard | | | |
|---|---|---|---|---|---|---|---|---|---|
| | A | B | C | D | | A | B | C | D |
| Celite-Hyflo[TM] [2] | 8 | 12 | 9 | 7 | Celite-Hyflo[TM] [2] | 4 | 7 | 5 | 4 |
| Sil-Flo 443[TM] [3] | 8 | 10 | 9 | 6 | Sil-Flo 443[TM] [3] | 4 | 7 | 5 | 4 |
| Attapulgite | 10 | 14 | 11 | 8 | Attapulgite | 6 | 9 | 7 | 6 |
| ASP-25 micron preferred formula | 8 | 8 | 8 | 6 | ASP-25 micron preferred formula | 4 | 6 | 4 | 5 |
| Activated carbon [1] | 8 | 13 | 10 | 9 | Activated carbon [1] | 5 | 10 | 7 | 6 |

[1] Activated carbon is added as 20% by weight of Celite-Hyflo[TM].
[2] Johns-Manville, diatomaceous earth.
[3] Sil-Flo Corporation, magnesium aluminum silicate.

NOTES

Recording except under D, is in units of p.s.i. (pound per square inch).
Blank spaces indicate a backwash to remove the filter aid from the filter medium before the pressure was recorded.

The results set forth in Tables II and III show that the filter aid composition remains useful even after long periods of stagnation. Further the result is improved as shown in Table III by the addition of the aluminum dust reducing agent.

A further method of generating carbon dioxide in situ is to introduce sodium carbonate into the system. Small amounts of water in the system liberate sufficient hydrogen ion to react with the sodium carbonate to produce carbon dioxide which aerates the filter medium. The results shown in Table I were essentially duplicated using sodium carbonate.

A means of generating nitrogen in situ is to introduce sodium nitrite into the system. The sodium nitrite apparently reacts with the basic amine soils to produce nitrogen gas. The results shown in Table II were essentially duplicated using sodium nitrite.

Thus it is preferred to use in admixture with an alkali metal carbonate such as sodium carbonate and an acid material, preferably an alkali metal acid phosphate such as potassium acid phosphate to generate carbon dioxide in situ. An alkali metal carbonate can be used alone to generate carbon dioxide in situ providing there is some hydrogen ion in the solvent or filter aid composition. Hydrogen can be generated in situ by the reducing agents. Nitrogen can be generated in situ by using an alkali metal nitrite such as sodium nitrite. All of these materials are aerating agents and will generate a gas in situ to improve the filtration rate.

Metallic dispersing agents

The sorbent earths are known to collect atmospheric water on their surfaces. The amount of sorption is proportional to the atmospheric relative humidity and the problem increases with the increasing humidity during storage. The presence of the atmospheric or free moisture on the surface of the sorbent materials prevents them from being wetted out by less polar solvents such as the non-polar dry cleaning solvents. It is thought that the reactive surfaces of these materials are separated from the non polar solvent material by a water film formed by the moisture. This free moisture also produces a cohesion or binding of the particles of the sorbent material and, as a result, the effectiveness of the sorbent material and the flow rate when used in a filter medium is greatly reduced.

It has been found that metal powders such as aluminum powder and zinc powder with a particle size between about 0.5 to 50 microns prevents the sorption of moisture and maintains the sorbent materials in a free-flowing granular state. This is apparently due to the separation of the particles of the sorbent material by the metal particles. The metal surface is attracted to the sorbent material and there appears to be an electrostatic attraction at the interface of the surfaces.

It has been found that the free moisture can be removed from the surface of the sorbent material by heating to a constant weight such as between about 200–300° F. and preferably around 220° F. and then cooling the sorbent material under low humidity conditions. The cooling temperature is preferably below 70° F. and is best below 40° F. and at an absolute humidity of about 10% or less. A small amount of metal powder (0.001 to 20.0 parts by weight dispersing agent per 1.0 part by weight sorbent material) is then uniformly dispersed through the dry sorbent material. The presence of the metal dust produces a water repellant, partially hydrophobic surface on the sorbent material allowing it to be free flowing and more readily wetted out by the solvent.

In order to illustrate the effect of the metal dust in rendering the surface of the sorbent material more hydrophobic the following sedimentation rate tests were conducted. The more hydrophobic the surface of the sorbent material is, the slower the sedimentation rate. Sedimentation rate is defined herein as the percent by volume that a 10 gram sample of sorbent material settles in 100 milliliters of Stoddard's solvent per unit of time.

Tables IV and V illustrate the percentage of the sample settled as a function of time. Column 1 shows moisture-free clays as above produced containing 1% by weight aluminum powder. Column 2 illustrates a clay containing 5% by weight free moisture and 1% by weight aluminum powder. Column 3 includes a clay containing 5% by weight free moisture.

TABLE IV

Sedimentation Rate for Magnesol [TM] [1] (magnesium silicate material)

| | Percentage | | |
|---|---|---|---|
| | 1 | 2 | 3 |
| Time minutes: | | | |
| 1 | 5 | 2 | 22 |
| 2 | 15 | 21 | 42 |
| 3 | 32 | 39 | 53 |
| 4 | 46 | 51 | 57 |
| 5 | 49 | 56 | 60 |
| 30 | 63 | 63 | 67 |

[1] Averly Chemical Company.

TABLE V

Sedimentation Rate for Attaclay [TM] [1] (magnesium aluminum silicate)

| | Percentages | | |
|---|---|---|---|
| | 1 | 2 | 3 |
| Time, Minutes: | | | |
| 1 | 3 | 8 | 28 |
| 2 | 10 | 19 | 42 |
| 3 | 23 | 28 | 51 |
| 4 | 32 | 32 | 53 |
| 5 | 38 | 38 | 56 |
| 30 | 55 | 60 | 70 |

[1] Minerals and Chemicals Philipp Corporation.

It can thus be seen from Tables IV and V that the sedimentation rate of the moisture containing and moisture free clays containing 1% by weight aluminum powder is at least initially greatly reduced. This illustrates the hydrophobic nature of the dispersing agents in combination with the sorbent materials.

To illustrate the hydrophobic character of the sorbent materials incorporating a metal powder, clays containing an additive of 2% by weight aluminum powder and untreated clays were stored under ambient conditions to determine the changes. The results are set forth in Table VI.

TABLE VI

|  | Magnesol TM [1] | | Attaclay TM [2] | |
| --- | --- | --- | --- | --- |
|  | Treated | Untreated | Treated | Untreated |
| Formation of microscopic aggregates (X500). | Negative | Positive | Negative | Positive. |
| Flow character of material | Free | Aglomerated. | Free | Aglomerated. |
| Free Moisture [3] | 6 | 8 | 4.5 | 6. |

[1] Magnesium aluminum adsorbent material, Averly Chemical Co.
[2] Attapulgite clay adsorbent material; Minerals and Chemicals, Philipp Corporation.
[3] Heating at 220° F. to constant weight.

It can thus be seen from Table VI that the clay materials treated with the metal powders in accord with the present invention remained free flowing, did not show microscopic caking and had a low moisture content because of the use of the metal powder, which acts as an anticaking agent or sorbent material dispersing agent.

The various clay materials treated in the aforementioned manner were mixed with various filter aid materials in order to determine the filtration rate. It was found that the combination of the filter aid materials with the sorbent materials, treated with the metal powders, considerably increased the filtration rates due to the dispersion of the sorbent material particles by the metal powder.

The materials listed in Tables IV and V were mixed with 50% by weight Celite 545$_{TM}$ (Johns-Manville) which is a flux calcined diatomaceous material. Fresh unsoiled Stoddard's solvent was used to determine the filtration rate. The following data was obtained:

TABLE VII

| Magnesol [1] | Percent of Maxium flow rate |
| --- | --- |
| 1 | 80 |
| 2 | 60 |
| 3 | 35 |
| Attaclay [2] |  |
| 1 | 85 |
| 2 | 70 |
| 3 | 30 |

[1] See Table VI.
[2] See Table VI.

As can be seen from Table VII, the filtration rate is greatly increased by the utilization of the metal powders. This is particularly true in the case of the comparison with the untreated clay materials shown in Column 3.

Table VIII illustrates various sorbent materials which were treated according to the process above discussed and left to stand for a week in order to determine the effect of surface moisture adhering the sorbent materials together added upon standing. Untreated sorbent materials were stored under the same conditions.

TABLE VIII

| Sorbent Material | Percent by weight free moisture | Percent by weight residue on 40 mesh screen | |
| --- | --- | --- | --- |
|  |  | Untreated materials | Aluminum treated materials |
| Attapulgite earth ASP-25 microns | 4 | 10 | 0.9 |
| Hysweet$_{TM}$* | 3 | 12 | 0.0 |
| Super-Celite Hyflo$_{TM}$* | 1 | 6 | 0.0 |
| Magnesol$_{TM}$* | 17 | 20 | 0.0 |
| Pennsorb$_{TM}$* | 3 | 7 | 0.0 |
| Activated carbon | 9 | 4 | 0.0 |

*See Table IX.

It can thus be seen that the metallic dispersing agents of the present invention are highly effective in producing free-flowing sorbent material compositions as well as highly effective filter aid compositions. The filter aid compositions contain about 0.005 to 1.5 parts by weight sorbent material and about 0.001 to 0.25 part by weight dispersing agent per 1.0 part by weight solid material. The preferred particle size is between about 0.05 to 100 microns, although 0.05 to 10 microns is especially preferred. The preferred metallic material is aluminum powder.

Non polar solvents

The improved filter aid compositions of the present invention can be used to remove impurities, particularly color impurities from non polar organic solvents. A non polar organic solvent is defined as an organic compound the electrons of which are held in electromagnetic union by sharing a common pair of electrons. This is opposed to a polar solvent which tends to be ionized. Examples of non polar solvents are, for instance, gasoline, ligroin (a fourth fraction petroleum distillation product) and various low boiling aliphatic and paraffin hydrocarbons and mixtures thereof. Aromatic solvents such as benzene, toluene, xylene and mixtures thereof are also non polar organic solvents. Various chlorinated hydrocarbons such as carbon tetrachloride, trichlorethylene, perchloroethylene and mixtures thereof are also examples of non-polar organic solvents. In general, the improved filter aid compositions of the present invention can be used in the filtration of any non polar organic solvent. Polar organic solvents were not filtered by the filter aid compositions of the present invention because of their adverse effect on the filter aids. The improved filter aid compositions of the present invention are specially preferred for the purification of or regeneration of dry cleaning solvents which are essentially non polar organic solvents.

Preparation of compositions

The following examples illustrate the process for the preparation of the improved filter aid compositions of the present invention. Example II illustrates the process for the preparation of the improved filter aid compositions of the present invention, wherein a solid material is coated with a sorbent material which is a metal acid salt. Example III illustrates the process for the preparation of a filter aid composition of the present invention incorporating a reducing agent and a filter aid material. Example IV illustrates the process for the preparation of the filter aid compositions of the present invention incorporating another reducing agent. Example V illustrates the process for the preparation of the preferred filter aid compositions of the present invention incorporating the filter aid material coated with the metal acid salt and a reducing agent. Example VI illustrates the process for the preparation of the preferred composition of the present invention incorporating the product of Example V in admixture with an aluminum and/or magnesium silicate sorbent agent or material.

Example II

Zinc chloride (2.0 grams) was mixed with enough water to completely dissolve it. A flux calcined diatomaceous earth (81.0 grams, Celite 545$_{TM}$, Johns-Manville) was carefully admixed with the zinc chloride solution. This was done to insure that all of the surfaces of the diatomaceous earth material were coated with the halide. The pH of the mixture was then adjusted using sodium hydroxide to about 6.5.

After mixing and pH adjusting was complete, the slurry was heated to 250° F. until the free water was essentially removed thereby coating the diatomaceous earth with a thin coating of zinc chloride.

The product, a zinc chloride coated diatomaceous earth was allowed to cool. Upon examination, it was found that the diatom structure of the diatomaceous earth was retained except that the surfaces were coated with zinc chloride.

Example III

Aluminum powder (0.05 grams, 30 microns) was carefully admixed with a diatomaceous earth (9.0 grams Celite $545_{TM}$). The careful mixing assured that the reducing agent was thoroughly blended with the diatomaceous earth.

A second carefully blended mixture of a diatomaceous earth (81.0 grams Celite $545_{TM}$) and water (4.2 grams) was admixed with the first prepared aluminum powder mixture. The resulting mixture was carefully blended to insure uniform distribution of the reducing agent throughout the mixture. The resulting composition was an improved filter aid composition of the present invention incorporating a reducing agent.

Example IV

One part by weight of calcium hydride powder was dispersed in 3 parts by weight of normal butanol to form a slurry. The slurry was mixed with nine parts by weight of a diatomaceous earth (Celite $545_{TM}$) which had been previously heated to remove all free moisture. The mixture was then heated to remove the butanol which resulted in a calcium hydride coating on the diatomaceous earth filter aid material.

Example V

The procedure of Example II was repeated to produce the zinc chloride coated diatomaceous earth using the identical amounts of the same components.

Water (4.2 grams) was carefully admixed with the diatomaceous earth. The resulting mixture was heated for a short period of time slightly below the boiling point of water to insure uniform distribution of the water in the mixture and then was allowed to cool to room temperature.

Aluminum powder (0.05 gram, 50 microns) was mixed with an additional portion of the diatomaceous earth (9.0 grams). The mixture was carefully blended into the zinc chloride coated diatomaceous earth mixture.

The product was an improved filter aid composition of the present invention incorporating both the zinc chloride coated diatomaceous earth and the aluminum reducing agent.

In the preferred compositions of the present invention a small amount of aluminum and/or magnesium silicate synthetic sorbent material is incorporated. Thus, a preferred composition of the present invention with the components set forth in percent by weight is as follows: (zinc chloride 2.0%; aluminum powder 0.05%; water 4.8%; diatomaceous earth 70.2% and attapulgite clay 20%).

Example VI

To prepare the preferred composition of the present invention the sorbent material attapulgite clay (2.0 grams) was carefully blended into the product of Example V.

Examples II–VI illustrate the processes for the preparation of the improved filter aid compositions of the present invention. Further, Examples II–VI illustrate the preferred compositions of the present invention and particularly preferred are the products of Examples V and VI. However, other materials can be used in the processes of Examples II–VI.

In the preferred formulations of the present invention, sorbent material is present in a range between about 0.5 to 60% by weight, with 20% by weight being preferred. The reducing agent is present in a range between about 0.01 to 10% by weight with 1% by weight being preferred.

The preferred sorbent materials are commercial clays, such as attapulgite, sepiolete and montmorillonete; various metal hydroxides which form a flocculate such as ferric hydroxide, zinc hydroxide and the like, these sorbent materials having been treated with an acidic material with a pH between about 2.5 to 6; and the various metal acid salts.

The preferred reducing agents are aluminum powder, zinc powder, magnesium powder and calcium hydride. The preferred dispersing agent is aluminum powder.

Examples II, V and VI illustrate the process of the present invention for coating the filter aid material with a metal acid salt. It has been found that this step must be conducted at a temperature of not less than about 250° F. and not more than about 300° F. It is preferred to conduct this step at a temperature between about 250–300° F. It is believed that the heating step causes the metal acid salt to be fused or bonded to the surface of the filter aid material and removes water which interferes with sorption.

The filter aid materials, such as preferred diatomaceous earths, preferably have a particle size between 20–80 microns. Generally, this is a bulk particle size and there can be some smaller or larger particles. It will be appreciated that other solids can be utilized such as the specially prepared attapulgite materials disclosed in Re. Patent No. 25,464. In general, any filter aid material will give improved results when used in the filter aid compositions of the present invention.

Testing of compositions

The filter aid compositions of the present invention were tested against known prior art materials in order to determine their effectiveness. There are a number of tests known to the prior art which are useful in demonstrating the effect of filtration upon various dry cleaning solvents.

One effective test for determining the effectiveness of filtration is to compare the color of the filtered solvent with the color of the unfiltered solvent. In order to make this comparison, the unfiltered solvent is diluted in increments of 5% by volume in separate flasks (10 ml. graduate cylinders) with the pure solvent. Thus, the unfiltered solvent is diluted with a 5%, 10%, 15%, 20%, or 25% of pure solvent. The dilution which the filtered solvent most closely resembles is taken as the percent color loss of the organic solvent upon filtration.

Another means of determining the effectiveness of the filtration is to compare the amount of non volatile residue present in the unfiltered and filtered solvents. This is done by distilling a volume of solvent until only a residue remains. This residue is the non-volatile residue and is measured in grams per 100 milliliters of solvent. The difference between the non volatile residue obtained from the filtered solvent and that obtained from the unfiltered solvent is the non volatile residue loss and is generally divided by the original residue in the unfiltered solvent to determine the percent non volatile residue times 100 equals the percent loss due to the filtration. This is a very effective test for determining the amount of impurities removed from the solvent upon filtration.

The free fatty acid content of the filtered and unfiltered solvents in the prior art is a good measure of the removal of these soluble impurities. The fatty acids are generally soluble impurities in solvents. The free fatty acid content is determined by titrating a sample, which is diluted with 33% by volume of a mixture of the solvent and isopropyl alcohol, to the phenolphthalein end-point with 0.1 N sodium hydroxide. The result is expressed in milligrams of fatty acid per 100 milliliters of solvent. The percentage is determined by dividing the difference in the free fatty acid content by the original amount in the unfiltered solvent.

Another important test is to determine the percent chemical activator loss due to the filtration. This is important in the area of dry cleaning solvents where the chemical acivators are principally utilized. An ideal filter aid will remove none of the chemical activators while removing soil. Removal of the chemical activators by the filter aid composition is contrary to the purpose of maintaining an ideal operating solvent and adds to the cost of operating the solvent in the ideal state. The percent chemical activator is determined by a Hyamine (Rohm and Haas Co., cationic detergent Hyamine 1622) titration using the methylene blue as an end-point indicator. The result is expressed in grams per unit volume of chemical activator. The percent chemical activator loss is determined by calculating a change between the filtered and unfiltered solvent and dividing by the original amount of the chemical activator per unit volume present in the unfiltered solution.

It is important that the filter aid composition remove the characteristic color from the non polar solvents, since this is related to the soil state and the soil state is related to the operating state of the solvent. Equally important is that the filtration rate be high. The filtration rate is expressed in volume of solvent flowing through the filter medium per minute and refers to the rate at which the solvent flows through the filter medium. The maximum flow rate is that flow rate where only the permeable member is utilized. A flow rate of less than 25% of the maximum flow rate is considered to be inoperative. In general, the flow rate is expressed as a percent of the maximum flow rate.

Four prior art filter aids were prepared. These consisted of five percent (5%) by weight of an adsorbent agent and ninety five percent (95%) by weight of a diatomaceous earth (Johns-Manville, Hyflow Super Cel$_{TM}$) which were tested and compared to the filter aid compositions of the present invention. Such prior art filter aid compositions are those which one would expect to find on the filter and are formed in the natural process of solvent maintenance. In general, the prior art adsorptive agents were an activated carbon or a magnesium and/or aluminum ferric silicate material (Hysweet$_{TM}$, Johns-manville; Magnesol, Averly Chemical Company; Pennsorb$_{TM}$, Pensalt Refining Company).

The results of the testing of the improved filter aid compositions of the present invention, as illustrated by Examples I–VI, and the prior art compositions is set forth in Table IX.

TABLE IX

| | Example | | | | Hyflo$_{TM}$ Alone |
|---|---|---|---|---|---|
| | II | III | V | VI | |
| Percent color loss | 5 | 5 | 10 | 25 | |
| Percent non-volatile residue loss | 5 | 5 | 10 | 20 | |
| Free fatty acid loss | 0.0 | 0.0 | 0.0 | 10 | |
| Percent chemical activator loss | None | None | None | None | |
| Percent maximum flow rate | 85 | 80 | 75 | 50 | 75 |
| pH | 6.7 | 7.5 | 7.3 | 7.8 | 7.3 |

| | 5% Hysweet$_{TM}$ in Hyflo Super Cel$_{TM}$ | 5% Magnesol$_{TM}$ in Hyflo Super Cel$_{TM}$ | 5% Pennsorb$_{TM}$ in Hyflo Super Cel$_{TM}$ | 5% activated carbon in Hyflo Super Cel$_{TM}$ |
|---|---|---|---|---|
| None | | 10 | 20 | 30 |
| 5 | | 5 | 10 | 15 |
| 25 | | 15 | 20 | 25 |
| 20 | | 40 | 75 | 90 |
| 20 | | 30 | 16 | 10 |
| 8.1 | 8.4 | 8.0 | 8.1 | |

As can be seen from Table IX the improved filter aid compositions of the present invention are very effective. Particularly effective are the compositions of Examples V and VI. There is considerable color reduction upon filtration resulting from the improved filter aid compositions of the present invention. There is a very high non-volatile residue reduction upon filtration. There is little or no activator loss in the treatment of the dry cleaning solvents. Acidic materials are not removed in any substantial amount as can be seen from the low acid removal by the filter aid compositions of the present invention. This is compared to the very high chemical activator and acidic material loss exhibited in the prior art compositions. Thus, it can be seen that the compositions of the present invention are extremely effective in removing impurities from non polar organic solvents.

The improved filter aid compositions of the present invention also result in a high flow rate through the filter medium. The flow rate is almost twice that of any of the prior art compositions. Thus, the combination of the very high flow rate with the extreme effectiveness of the improved filter aid compositions of the present invention make them particularly valuable.

It is especially preferred to incorporate into the compositions of the present invention and/or have present in the solvent to be regenerated a small amount of water. In the compositions of the present invention about 1 to 10 percent water is preferred. In the solvent about 0.01 to 0.5 percent, especially about 0.1 percent by volume water is preferred. This water allows the various acidic materials and salts used in the present invention to ionize and more effectively perform their respective functions. In most instances the used solvents to be regenerated have sufficient water for this purpose. Water can easily be added to this solvent for this purpose.

A particularly preferred composition of the present invention comprises in admixture by weight (a) about 71.3 percent diatomaceous earth; (b) about 0.5 percent ferric hydroxide; (c) about 20.0 percent attapulgite clay; (d) about 7.0 percent potassium hemiphosphate; (e) about 0.5 percent aluminum; (f) about 0.2 percent magnesium; and (g) water in the amount of about 5 percent of the total weight of components (a) through (f).

It will be appreciated that the foregoing description is only illustrative of the present invention and that this invention is to be limited only by the hereinafter appended claims.

I claim:

1. An improved filter aid composition for removing soil complex impurities from non-polar organic dry cleaning solvents which comprises:
   (a) a filter aid material;
   (b) a reducing agent in combination with the filter aid material which reacts with soil complex impurities in the presence of small amounts of water to insolubilize soil complex impurities, the composition containing about 0.0001 to 0.25 part by weight reducing agent per 1.0 part by weight filter aid material.

2. An improved filter aid composition for removing soil complex impurities from non-polar organic dry cleaning solvents which comprises:
   (a) a filter aid material;
   (b) a reducing agent in combination with the filter aid material which reacts with soil complex impurities in the presence of small amounts of water to insolubilize soil complex impurities; and
   (c) a sorbent material, which reacts with soil complex impurities in the presence of water to precipitate soil complex impurities, consisting of a metal acid salt bonded to the surfaces of the filter aid material, the composition containing about 0.0001 to 0.25 part by weight reducing agent and about 0.0005 to 2.0 parts by weight sorbent material per about 1.0 part by weight filter aid material and the composition having a pH measured with about 1 to 5 percent by weight water of between about 4 to 8.

3. The composition of claim 2 wherein said reducing agent is a finely divided metal with a particle size between about 0.01 and 100 microns.

4. A filter aid composition which comprises:
   (a) a filter aid material;
   (b) a substantially dry clay sorbent material with a particle size between about 0.05 and 100 microns in admixture with the filter aid material; and
   (c) a hydrophobic powder of metal having a particle size between about 0.5 to 50 microns, which prevents adhesion of the particles of the sorbent material because of moisture, in admixture with the filter aid material and sorbent material, the composition remaining essentially free-flowing for extended periods of time and the composition containing about 0.0005 to 2.0 parts by weight sorbent material and 0.001 to 0.25 part by weight hydrophobic powder of metal per 1.0 part by weight filter aid material.

5. An improved filter aid composition for maintaining the porosity of a filter cake in situ during removal of impurities from non-polar organic dry cleaning solvents in the presence of small amounts of water which comprises:
   (a) a filter aid material;
   (b) between about 0.0001 to 0.25 part by weight of an aerating agent in combination with 1.0 part by weight of the filter aid material, the aerating agent being a composition which generates a gas in situ to improve the filtration rate through the filter cake; and
   (c) between about 0.0001 and 0.25 part by weight of a reducing agent in combination with 1.0 part by weight of the filter aid material, which reducing agent reacts with soil complex impurities in the presence of small amounts of water to insolubilize soil complex impurities.

6. An improved filter aid composition which comprises in admixture by weight:
   (a) about 71.3 percent diatomaceous earth;
   (b) about 0.5 percent ferric hydroxide;
   (c) about 20.0 percent attapulgite clay;
   (d) about 7.0 percent potassium hemiphosphate;
   (e) about 0.5 percent aluminum;
   (f) about 0.2 percent magnesium; and
   (g) water in the amount of about 5 percent of the total weight of components (a) through (f).

7. The process for the preparation of an improved sorbent material for use in filter aid compositions which comprises:
   (a) heating a clay sorbent material with a particle size between about 0.05 and 100 microns until it is substantially dry;
   (b) anhydrously cooling the sorbent material; and
   (c) mixing a hydrophobic powder of metal having a particle size between 0.5 and 50 microns, which prevents the adhesion of the particles of the sorbent material because of moisture, with the cool, anhydrous sorbent material, thereby producing the sorbent material product, the product containing about 0.001 to 20.0 parts by weight hydrophobic powder of metal per 1.0 part by weight clay sorbent material.

References Cited

UNITED STATES PATENTS

| | | | |
|---|---|---|---|
| 2,036,258 | 4/1936 | Commins | 210—506 X |
| 2,040,818 | 5/1936 | Badollet | 210—506 |
| 2,448,337 | 8/1948 | Wickenden | 210—500 X |
| 2,464,204 | 3/1949 | Baker. | |
| 2,508,602 | 5/1950 | Goetz | 210—500 X |
| 2,564,926 | 8/1951 | Rapier | 210—500 X |
| 2,668,151 | 2/1954 | Pedlow et al. | 210—506 X |
| 2,406,849 | 9/1946 | Upham. | |
| 3,043,771 | 7/1962 | Bloch | 210—24 X |
| 3,101,318 | 8/1963 | Watson et al. | 210—75 X |
| 3,335,869 | 8/1967 | Hedges | 210—500 |

REUBEN FRIEDMAN, Primary Examiner

W. S. BRADBURY, Assistant Examiner

U.S. Cl. X.R.

210—36, 502, 503, 504, 506